(12) United States Patent
Huelbusch

(10) Patent No.: US 9,847,023 B2
(45) Date of Patent: Dec. 19, 2017

(54) METHOD AND INFORMATION SYSTEM FOR INFORMING A VEHICLE DRIVER REGARDING THE CONDITIONS OF A PLANNED PASSING MANEUVER

(75) Inventor: Katja Huelbusch, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 14 days.

(21) Appl. No.: 13/877,597

(22) PCT Filed: Sep. 15, 2011

(86) PCT No.: PCT/EP2011/065987
§ 371 (c)(1),
(2), (4) Date: Jun. 25, 2013

(87) PCT Pub. No.: WO2012/045558
PCT Pub. Date: Apr. 12, 2012

(65) Prior Publication Data
US 2013/0271295 A1    Oct. 17, 2013

(30) Foreign Application Priority Data

Oct. 7, 2010   (DE) .................... 10 2010 042 115

(51) Int. Cl.
*B60K 35/00* (2006.01)
*G08G 1/0962* (2006.01)
*B60W 50/14* (2012.01)

(52) U.S. Cl.
CPC ......... *G08G 1/09626* (2013.01); *B60W 50/14* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,652,705 | A * | 7/1997 | Spiess | G08G 1/164 701/117 |
| 6,304,811 | B1 * | 10/2001 | Prestl | B60K 31/0008 180/170 |
| 6,842,687 | B2 * | 1/2005 | Winner et al. | 701/93 |
| 2002/0117340 | A1 * | 8/2002 | Stettner | 180/169 |
| 2002/0138180 | A1 * | 9/2002 | Hessing et al. | 701/1 |

(Continued)

FOREIGN PATENT DOCUMENTS

CN        2095130 U       2/1992
CN       101124103 A      2/2008
(Continued)

OTHER PUBLICATIONS

International Search Report for PCT/EP2011/065987, dated Jan. 25, 2012.

*Primary Examiner* — Brian Zimmerman
*Assistant Examiner* — Cal Eustaquio
(74) *Attorney, Agent, or Firm* — Norton Rose Fulbright US LLP; Gerard Messina

(57) ABSTRACT

In a method for informing a vehicle driver regarding the conditions of an upcoming passing maneuver, a speed of a preceding vehicle is ascertained and compared to a speed of a vehicle of the vehicle driver, and a passing duration is estimated and/or computed and displayed to the vehicle driver directly and/or in processed form.

17 Claims, 1 Drawing Sheet

(56) References Cited

U.S. PATENT DOCUMENTS

| | | | |
|---|---|---|---|
| 2003/0025597 A1* | 2/2003 | Schofield | B60Q 1/346 340/435 |
| 2003/0163229 A1 | 8/2003 | Pillar et al. | |
| 2005/0256630 A1* | 11/2005 | Nishira et al. | 701/96 |
| 2007/0052555 A1* | 3/2007 | Ibrahim | 340/990 |
| 2007/0120657 A1* | 5/2007 | Schofield | B60N 2/002 340/435 |
| 2008/0174453 A1* | 7/2008 | Schofield | 340/933 |

FOREIGN PATENT DOCUMENTS

| | | |
|---|---|---|
| DE | 36 22 447 | 1/1988 |
| DE | 3622447 C1 | 1/1988 |
| DE | 3622447 C1 | 1/1998 |
| DE | 102 55 331 | 6/2004 |
| DE | 10 2004 029860 | 12/2005 |
| DE | 10 2005 036794 | 2/2007 |
| DE | 10 2010 046599 | 4/2011 |
| EP | 2 060 466 | 5/2009 |
| SU | 1263564 A1 | 10/1986 |
| WO | WO 2010/099789 | 9/2010 |

* cited by examiner

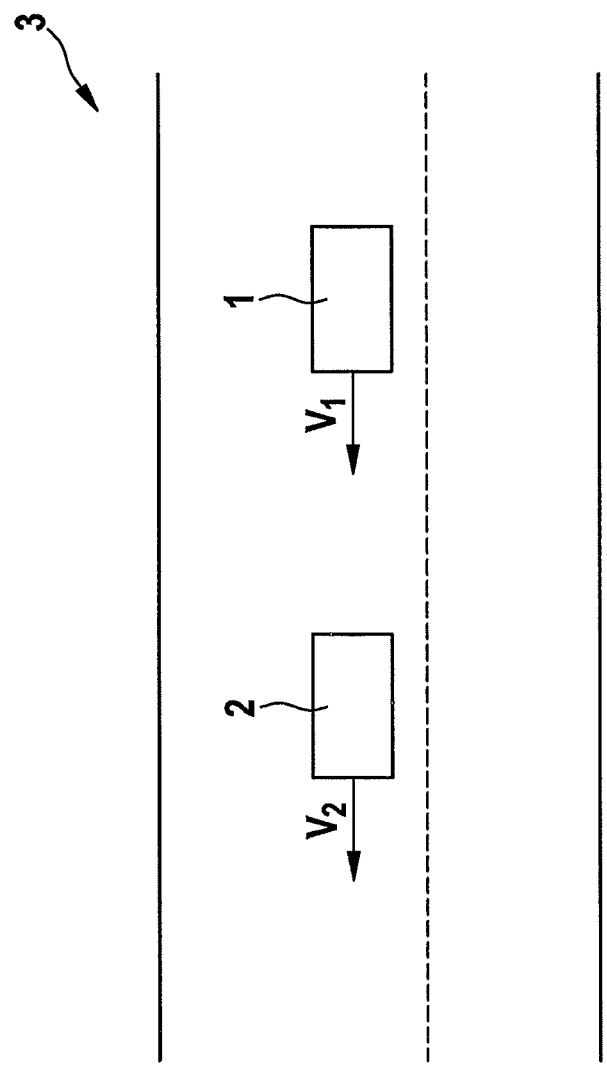

METHOD AND INFORMATION SYSTEM FOR INFORMING A VEHICLE DRIVER REGARDING THE CONDITIONS OF A PLANNED PASSING MANEUVER

BACKGROUND OF THE INVENTION

1. Field of the Invention

The present invention relates to a method for informing a vehicle driver regarding the conditions of an upcoming passing maneuver.

2. Description of the Related Art

During passing maneuvers, it may occur that the passing vehicle's speed is only slightly higher than that of the vehicle being passed. For this reason, a passing maneuver may take a lot of time under certain circumstances. Such a situation occurs particularly frequently in the case of trucks. For this reason, the introduction of additional no passing zones for trucks has been discussed time and time again. In addition, such a situation also frequently occurs with passenger cars in countries in which there is also a general speed limit on expressways.

An information system for informing a vehicle driver regarding the properties of route sections of a travel route, which lie ahead of the vehicle from a vehicle location in the direction of travel, is known from published German patent application document DE 102 55 331 A1; this information system includes means for determining the vehicle location and includes means for determining the route sections of a travel route, which lie ahead of the vehicle from a vehicle location in the direction of travel, and means for determining the properties of the route sections, means for outputting the properties, or the information describing the properties, to the vehicle driver, this information system distinguishing itself in that the properties include properties of the route sections which are relevant for passing maneuvers. In this way, it is made possible that a vehicle driver is informed in due time regarding passing opportunities coming up on his/her route, thus allowing for an anticipatory and relaxed driving behavior of the vehicle driver which contributes to the general traffic safety.

In this information system known from the related art, only static conditions, namely future route properties, are considered. Dynamic conditions, such as other road users, are not considered.

BRIEF SUMMARY OF THE INVENTION

Based on this, the object underlying the present invention is to also provide the driver with information regarding the properties of other road users according to a method of the type mentioned at the outset, in order to assist him with (planned) passing maneuvers.

According to the present invention, a method is provided for informing a vehicle driver regarding the conditions of an upcoming passing maneuver, in which a speed of a preceding vehicle is ascertained and compared to a speed of a vehicle of the vehicle driver. The result is then used to estimate and/or compute a passing duration. This information may then be displayed to the vehicle driver directly and/or in processed form.

According to the present invention, in processed form is understood to mean here that absolute numbers are not output, but relative indications are made.

Here, it may be advantageous according to one preferred specific embodiment of the present invention when the processed form includes a traffic light display.

The traffic light display may in this case, for example, include the indications GREEN for uncritical to pass, YELLOW for critical to pass, and RED for too dangerous or not reasonable to pass.

According to the present invention, it may be displayed to the driver of a vehicle, e.g., of a truck, how great the delta is between his/her speed and that of another vehicle.

In one particularly preferred embodiment of the present invention, the speed of both vehicles is determined at multiple measuring points in time n; an average value is formed from these values and a duration of the passing maneuver or a relative speed is ascertained with the aid of these average values.

This has been proven to be advantageous in particular since the delta between a speed of the vehicle of a vehicle driver and that of another vehicle is not static. A decision process "to pass or not to pass" may, for example, take several seconds or more. The determination of the relative speed or the delta between the speeds of both vehicles thus preferably takes place via preinterpolation to also consider acceleration and/or deceleration and to allow for anticipation. If an ascertained relative speed is low or even too low, at least this should be clearly displayed to the vehicle driver. For this reason, an already mentioned traffic light display may be used which displays the following:

GREEN: uncritical to pass
YELLOW: critical to pass
RED: dangerous or not reasonable to pass With the aid of a method according to the present invention, the safety of all road users involved may be increased since dangerous passing maneuvers may be avoided. This is in particular based on the fact that the vehicle driver is able to assess the driving situation better due to the information and therefore has an improved basis for making decisions with regard to passing.

For this reason, not only the safety of the people in the passing vehicle is increased, but also that of the people in the vehicle being passed, as well as of the vehicles in the surroundings and of passers-by.

In order to make the safest possible decision, it is provided according to one preferred specific embodiment that the display for the vehicle driver includes a relative speed and/or an anticipated passing duration.

To obtain an optimal adaptation to the changes, the relative speed and/or the anticipated passing duration should be continuously computed.

It is apparent from the above-described explanations that the range of applications of the method according to the present invention is very wide. In the case of trucks, it may be particularly helpful for passing maneuvers on two-lane roadways, e.g., expressways. In this way, extremely long passing maneuvers may be avoided which are not reasonable.

In addition to the information described so far, pieces of information regarding the speed of following vehicles may also be recorded, for example, with the aid of a method according to the present invention. It is thus conceivable, for example, that it is also displayed to the vehicle driver if very fast vehicles are approaching from behind. The traffic density and/or the street situation (curves, weather), for example, may also be considered in the traffic light display. For this purpose, sensors or cameras may be provided on the vehicle, or pieces of information from traffic reports may also be used.

In particular for passenger cars, an application for one-lane roads, e.g., highways, is also conceivable. In this way, it is, for example, possible for the passing duration to be computed, to be subsequently directly compared to the visibility (weather, routing of roads), and, if necessary, for the length of the passing duration to be displayed on a map. Furthermore, a camera may identify directly oncoming vehicles on the route, and display them in the case of danger.

Furthermore, a recommendation may be made to increase the speed for a passing maneuver. In this case, it is also possible to consider the maximally permissible or maximally possible speed of the vehicle or to output a warning if this speed is exceeded.

Moreover, it is also conceivable that the future routing is considered in such a way that it is displayed if, for example, turning or leaving a road is planned in the near future.

According to the present invention, an information system, in particular a navigation system, is also provided for informing a vehicle driver regarding the conditions of an upcoming passing maneuver, means being provided for measuring a speed of a preceding vehicle and also means being provided for comparing a speed of a vehicle of the vehicle driver, and these speeds being compared to one another, and furthermore, means being provided which estimate and/or compute a passing duration, and means being provided for displaying same to a vehicle driver directly and/or in processed form.

Moreover, a computer program product is also proposed according to the present invention which has program parts for executing a method, which is described above in greater detail, and a machine-readable, in particular computer-readable, data structure generated by a method, which is described above in greater detail, and/or by at least one computer program product.

BRIEF DESCRIPTION OF THE DRAWING

FIG. 1 shows a method of the present invention according to one preferred specific embodiment.

DETAILED DESCRIPTION OF THE INVENTION

Two vehicles 1 and 2 are illustrated in FIG. 1 which travel on a road 3 at speeds v1 and v2, respectively.

Since the speed of vehicle 1, v1, is higher than the speed of vehicle 2, v2, it could be that the driver of vehicle 1 wants to pass vehicle 2.

Now, to assist the vehicle driver of vehicle 1 in his/her decision, the speeds of both vehicles 1, 2 are compared. In this way, the speeds of both vehicles 1, 2 are determined at n measuring points in time. For vehicle 1 of the vehicle driver this takes place in the conventional manner via the so-called speedometer. The speed of preceding vehicle 2 may, for example, be [determined] via a distance measurement. This may be carried out with the aid of a beam-emitting process, known per se, such as radar or the like. These measurements are repeated at very short time intervals. This knowledge of the time-related distance and of the particular distance between the vehicles may then be used to ascertain the speed of a preceding vehicle.

Such a speed measurement may, if desired, also take place for a following vehicle.

The speed for m future points in time anticipated in each case is ascertained from the measurements at n measuring points in time via a preinterpolation.

The average value of the future speed for the duration of the passing maneuver is made available to the driver for information purposes as a relative speed or a piece of information derived therefrom, e.g., the mentioned traffic light display or another type of display. Here, continuous updates regarding new computations preferably take place during the drive.

The storage of data, such as the measured speed data, preferably takes place in a storage unit of the vehicle, e.g., of navigation or also toll equipment of the vehicle. The data are processed by processor(s) in the corresponding equipment.

The human-machine-communication, in turn, takes place via the output or operating unit of the corresponding equipment.

What is claimed is:

1. A method for informing a driver of a host vehicle regarding conditions of an upcoming passing maneuver by the host vehicle, comprising:
   ascertaining, by processing circuitry, a speed of a target vehicle ahead of the host vehicle;
   comparing, by the processing circuitry, the ascertained speed of the target vehicle to a speed of the host vehicle;
   computing a relative speed of the target vehicle to the host vehicle;
   identifying, by the processing circuitry and based on the comparison, a value, in units of time, of a future point in time at which the passing maneuver would be completed; and
   displaying to the vehicle driver the relative speed and at least one of (i) the identified value, and (ii) an information derived from the identified value;
   wherein the relative speed is determined via preinterpolation to account for acceleration of at least one of the target vehicle and the host vehicle.

2. The method as recited in claim 1, wherein the derived information is displayed as a traffic light display.

3. The method as recited in claim 2, wherein the traffic light display includes a GREEN display when the passing maneuver is calculated to be performable in a duration corresponding to the identified value at the speed of the host vehicle, a YELLOW display when the passing maneuver is calculated to be performable with an increase in speed of the host vehicle, and a RED display when a determination is made that the passing maneuver is too dangerous to perform.

4. The method as recited in claim 1, wherein the compared speeds are an average speed of the and an average speed of the target vehicle determined based on the measured values at the multiple values at the multiple measuring points in time.

5. The method as recited in claim 1, wherein at least one of the value and the relative speed is continuously computed.

6. An information system for informing a driver of a host vehicle regarding conditions of an upcoming passing maneuver by the host vehicle, comprising:
   means for ascertaining a speed of a target vehicle ahead of the host vehicle;
   means for comparing the ascertained speed of the target vehicle to a speed of the host vehicle;
   means for computing a relative speed of the target vehicle to the host vehicle;
   means for identifying, based on the comparison, a value, in units of time, of a future point in time at which the passing maneuver would be completed; and
   means for displaying to the vehicle driver the relative speed and at least one of (i) the identified value, and (ii) an information derived from the identified value;
   wherein the relative speed is determined via preinterpolation to account for acceleration of at least one of the target vehicle and the host vehicle.

7. A non-transitory computer-readable data storage medium storing a computer program having program codes which, when executed on a computer, perform a method for informing a driver of a host vehicle regarding conditions of an upcoming passing maneuver by the host vehicle, the method comprising:

ascertaining a speed of a target vehicle ahead of the host vehicle;

comparing the ascertained speed of the target vehicle to a speed of the host vehicle;

computing a relative speed of the target vehicle to the host vehicle;

identifying, based on the comparison, a value, in units of time, of a future point in time at which the passing maneuver would be completed; and displaying to the vehicle driver the relative speed and at least one of (i) the identified value, and (ii) an information derived from the identified value;

wherein the relative speed is determined via preinterpolation to account for acceleration of at least one of the target vehicle and the host vehicle.

8. The method as recited in claim 1, wherein, if the derived information indicates that a relative speed is too low to execute the passing maneuver, an indication that the speed is too low is displayed.

9. The method as recited in claim 1, further comprising:

ascertaining a speed of an approaching vehicle behind the host vehicle;

comparing the ascertained speed of the approaching vehicle to the speed of the host vehicle; and displaying to the vehicle driver a warning if the comparison indicates that the approaching vehicle is approaching above a predefined speed threshold.

10. The method as recited in claim 1, wherein the displaying includes displaying on a map a length of a duration corresponding to the identified value.

11. The method as recited in claim 1, wherein the displaying includes outputting a recommendation to increase speed for the passing maneuver.

12. The method as recited in claim 1, wherein the traffic light display changes according to a consideration of a street situation.

13. The method as recited in claim 1, wherein the display changes according to a curving road and a weather concern.

14. The method as recited in claim 3, wherein the traffic light display changes according to a consideration of a traffic density.

15. A method for informing a driver of a host vehicle regarding conditions of an upcoming passing maneuver by the host vehicle, comprising:

obtaining, by processing circuitry, measurements of a speed of the host vehicle a plurality of points in time;

ascertaining, by the processing circuitry, a speed of a target vehicle ahead of the host vehicle at the plurality of points in time;

interpolating, by the processing circuitry, the obtained and ascertained speeds of the host and target vehicles to determine anticipated speeds of the host and target vehicles over the course of a future period of time, thereby accounting for anticipated changes in speeds of the target and host vehicles over time;

comparing, by the processing circuitry, the determined anticipated speeds of the target vehicle to the determined anticipated speeds of the host vehicle;

computing, based on a result of the comparison, an anticipated relative speed of the target vehicle to the host vehicle during the future period of time;

identifying, by the processing circuitry and based on the computation of the anticipated relative speed, a value, in units of time, of a future point in time at which the passing maneuver would be completed, wherein the future period of time includes a period during which the passing maneuver would be performed; and displaying to the vehicle driver the relative speed and at least one of (i) the identified value, and (ii) an information derived from the identified value.

16. The method as recited in claim 15, wherein the compared speeds are an average of the anticipated speed of the host vehicle and an average of the anticipated speed of the target vehicle at multiple points in time in the future period of time.

17. The method as recited in claim 12, wherein the street situation is based on one of: a curving of a road and a weather concern.

* * * * *